United States Patent Office 3,193,605
Patented July 6, 1965

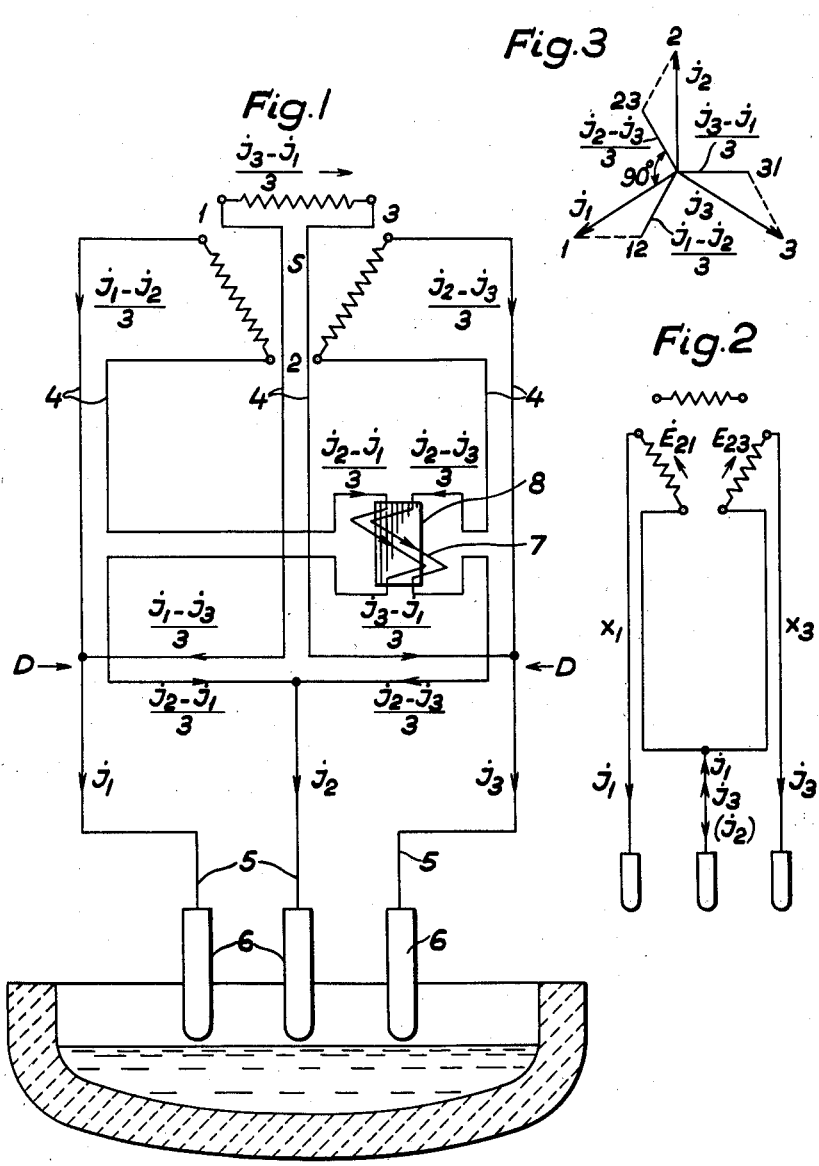

3,193,605
MEANS FOR SYMMETRIZING THE LOAD IN ELECTRIC THREE-PHASE ARC FURNACES
Ludvig Dreyfus, Vasteras, Sweden, assignor to Allmänna Svenska Elektriska Aktiebolaget, Vasteras, Sweden, a Swedish corporation
Filed Jan. 15, 1962, Ser. No. 166,350
Claims priority, application Sweden, Jan. 30, 1961, 898/61
2 Claims. (Cl. 13—12)

In three-phase arc furnaces the wires from the three phases of the transformer to the three electrodes are traced, as a rule, so that the wire to one of the electrodes lies, as viewed from above, between the wires to the other electrodes and substantially in the same horizontal plane. It is therefore possible to speak about a "middle" wire and "outer" wires, even though the electrodes are usually arranged in the corners of an equilateral triangle. Analogically the terms "middle" electrode and "outer" electrodes are used even though these terms do not conform with their geometric position.

For the sake of convenience the said terms are used in the following description and claims.

Usually each electrode is connected to one end of a bundle of cables the other end of which is fixed on the bus bar system of the transformers. The secondary transformer phases are, as a rule, delta connected by means of a plurality of parallel-connected bars per pole. For reducing eddy current losses in the bars and in the iron constructions the bars of different polarities are placed in interleaved arrangement i.e. so that adjacent bars in each phase lead currents in opposite directions. This arrangement however can only be employed up to the point where the bundles of cables for the electrodes are suspended from the bars. It is a known fact that the mounting of the bundles of cables in three planes with large mutual distances produces important asymmetries of the currents and power in the three phases.

According to the Patent No. 2,758,144 these asymmetries can be eliminated by a suitably dimensioned self reactance in the middle cable bundle. The middle bundle has therefore been provided with a laminated iron core with an appropriate number of air gaps.

By this means the actual purpose, i.e. the symmetrizing of the phases has been attained, but this embodiment has the disadvantage that the reactance lies in a region where the wiring system no longer has an interleaved arrangement. The consequence is that heavy leakage flux and eddy current losses arise in the reactance which in turn produces further leakage flux and eddy current losses in the reinforcing iron constructions in the site for the furnace. A suitable symmetrizing means is therefore necessary in which measures are taken in the region of the interleaved bar system.

The present invention provides a solution to the above mentioned problem.

The invention relates to a symmetrizing means for electric three-phase arc furnaces having a middle electrode carrying the current $I_2$ and two outer electrodes carrying the currents $I_1$ and $I_3$, respectively, fed from transformers in delta connection comprising a middle phase leading the current $$\frac{I_3-I_1}{3}$$

and two outer phases, carrying the currents $$\frac{I_1-I_2}{3}$$

and $$\frac{I_2-I_3}{3}$$

respectively. According to the invention, such a symmetrizing means is characterized by a reactance element having two windings which produce fluxes in the same direction, each of which is series-connected with one outer phase of the transformer so that the resulting number of ampere-turns of the reactance element is proportional to $$-\frac{I_1-I_2}{3}+\frac{I_2-I_3}{3}=I_2$$

In the accompanying drawing FIG. 1 is a wiring diagram of the means according to the invention and FIG. 2 is a simplified diagram. In FIG. 3 the vector diagram of the phase currents with respect to the electrode currents is shown.

From the secondaries S of three single-phase transformers interleaved bars 4 lead to a delta connection point D—D from which "non-interleaved" bundles of cables 5 carrying the currents $I_1$, $I_2$ and $I_3$ to the electrodes 6 in the arc furnace. Since the electrodes may be considered as being star-connected $$I_1+I_2+I_3=0 \qquad (1)$$

When symmetrizing is accomplished, the secondary currents of the transformers are $$\frac{I_1-I_2}{3};\ \frac{I_2-I_3}{3};\ \frac{I_3-I_1}{3} \qquad (2)$$

As will be seen from FIG. 1 the terminology "outer phases" (1–2 and 2–3 respectively) and "middle phase" (3–1) may also be used for the transformer phases.

Symmetrizing of the currents and power is obtained by a reactance element having two equal windings wound without any appreciable mutual inductive leakage which are magnetized by the sum of the currents of the outer phases.

$$\frac{I_2-I_1}{3}+\frac{I_2-I_3}{3}=\frac{2}{3}I_2-\frac{I_1+I_3}{3}=I_2 \qquad (3)$$

which produce in each of their circuits the same inductive voltage drop $$I_2\cdot\left[\frac{x_1+x_3}{2}-2y\right]=I_2[x-2y]=I_2x_{2\mathrm{d}} \qquad (4)$$

In the equation $x_1$ and $x_3$ indicate the reactance of the single phase circuit comprising according to FIG. 2 the middle electrode, one of the outer electrodes included in the associated transformer phase, the bars, and the bundles of cable while $y$ indicates the mutual reactance between the said circuits. It is an essential feature of the invention that the reactance element comprising the windings 7 and an iron core 8 is positioned in a field-free zone that is, in the region of the interleaved bars and that this may be easily carried out so that appreciable outer leakage fields cannot be produced.

As proof of efficiency of the means according to the invention the following explanations may be made.

In the following explanation:

$E_{21}$, $E_{23}$ denote the symmetrical terminal voltages of the outer phases of the transformers;
$E_1$, $E_2$, $E_3$ the corresponding (ideal) neutral point voltages;
$r_1=r_2=r_3=r$ the resistances of the phases-on-symmetrical load;
$x_1=x_3=x$ the reactances of the above mentioned single-phase circuits except for the reactance $x_{2\mathrm{d}}$ of the reactance element Including said reactance element the voltage equations for both said outer phases are:

$$E_{21}=I_1[2r-jx_1]+I_3[r-jy]+jI_2x_{2\mathrm{d}} \qquad (5)$$

$$E_{23}=I_3[2r-jx_3]+I_1[r-jy]+jI_2x_{2\mathrm{d}} \qquad (6)$$

From the symmetrical terminal voltages $E_{21}$ and $E_{23}$ the neutral point voltages $E_1$ and $E_2$ are derived on symmetrical load, by the difference $$E_{21}-E_{23}=E_1-E_3 \qquad (7)$$

The difference (5)—(6) therefore gives:

$$E_1-E_3=I_1[r-j(x_1-y)]-I_3[r-j(x_3-y)] \qquad (8)$$

On symmetrical load this equation may be considered as:

$$E_1=I_1[r-j(x_1-y)]; \; E_3=I_3[r-j(x_3-y)] \qquad (8a)$$

The neutral point voltage $E_2$ is obtained by the operation $-\frac{1}{3}[(5)+(6)]$ i.e. by addition of Equations 5 and 6, change of sign, and division by 3. This operation gives with $I_2=-(I_1+I_3)$ $$\tfrac{1}{3}[E_{12}+E_{32}]=E_2=I_2\left[r-j\frac{x_1+x_3+2y}{6}-j\frac{2x_{2d}}{3}\right] \qquad (9)$$

with respect to Equation 8a. However, for symmetrical load the netural point voltage $E_2$ must be $$E_2=I_2\left[r-j\left(\frac{x_1+x_3}{2}-y\right)\right] \qquad (9a)$$

The condition for symmetrizing therefore requires that the right hand members of Equations 9 and 9a be equated and solved for the required impedance, that is $$\frac{2x_{2d}}{3}=\left[\frac{x_1+x_3}{2}-y\right]-\left[\frac{x_1+x_3}{6}+\frac{y}{3}\right]$$

$$=\frac{x_1+x_3}{3}-\frac{4y}{3}$$

$$x_{2d}=\frac{x_1+x_3}{2}-2y \qquad (10)$$

quod est demonstrandum.

The magnitudes I and E denote time vectors for the currents and voltages.

I claim:

1. Means for symmetrizing the load in electric three-phase arc furnaces having a middle electrode carrying the current $I_2$, and two outer electrodes carrying the currents $I_1$ and $I_3$, respectively fed from transformer means in delta-connection comprising a middle phase carrying the current $$\frac{I_3-I_1}{3}$$

and two outer phases carrying the currents $$\frac{I_1-I_2}{3}$$

and $$\frac{I_2-I_3}{3}$$

respectively, feeding means from said transformer means to said electrodes comprising interleaved bars, bundles of cables, and non-interleaved bars, said feeding means further comprising a reactance element having two windings which produce fluxes of the same direction, each of which being series-connected with one outer phase of the transformer so that the resulting number of ampere turns of the reactance element is proportional to $$-\frac{I_1-I_2}{3}+\frac{I_2-I_3}{3}=I_2$$

the reactance element being inserted in the feeding means in the region of the interleaved bars.

2. Means according to claim 1, wherein each winding of the reactance element has approximately the reactance $$x_{2d}=\frac{x_1+x_3}{2}-2y$$

wherein $x_1$ and $x_3$ respectively denote the reactance of the single-phase circuit comprising the middle electrode and one outer electrode, and the associated transformer phase, and $y$ denotes the mutual reactance between the said circuit.

References Cited by the Examiner
UNITED STATES PATENTS

| | | | |
|---|---|---|---|
| 2,758,144 | 8/56 | Dreyfus | 13—12 |
| 3,059,171 | 10/62 | Storsand | 323—61 |

FOREIGN PATENTS

| | | |
|---|---|---|
| 598,190 | 5/60 | Canada. |
| 613,320 | 1/61 | Canada. |

LLOYD McCOLLUM, *Primary Examiner.*